(12) United States Patent
Yazhemsky et al.

(10) Patent No.: US 12,140,958 B2
(45) Date of Patent: Nov. 12, 2024

(54) CONTROLLER, CONTROL SYSTEM AND METHOD FOR VEHICLE CONTROL

(71) Applicant: Hitachi Rail GTS Canada Inc., Toronto (CA)

(72) Inventors: Dennis Ion Yazhemsky, Toronto (CA); Alon Green, Toronto (CA)

(73) Assignee: Hitachi Rail GTS Canada Inc., Toronto (CA)

( * ) Notice: Subject to any disclaimer, the term of this patent is extended or adjusted under 35 U.S.C. 154(b) by 666 days.

(21) Appl. No.: 17/184,079

(22) Filed: Feb. 24, 2021

(65) Prior Publication Data

US 2021/0263527 A1    Aug. 26, 2021

Related U.S. Application Data

(60) Provisional application No. 62/980,694, filed on Feb. 24, 2020.

(51) Int. Cl.
*G05D 1/02* (2020.01)
*G05D 1/00* (2006.01)
*G06N 3/04* (2023.01)

(52) U.S. Cl.
CPC ......... *G05D 1/0221* (2013.01); *G05D 1/0223* (2013.01); *G06N 3/04* (2013.01)

(58) Field of Classification Search
CPC ...... G05D 1/0221; G05D 1/0223; G05D 1/00; G06N 3/04; G06N 3/08; B61L 15/0058; B61L 15/0062; B61L 15/0072; B61L 27/60
See application file for complete search history.

(56) References Cited

U.S. PATENT DOCUMENTS

| | | | | |
|---|---|---|---|---|
| 5,904,215 A | * | 5/1999 | Ikeda | B60T 8/174 |
| | | | | 180/170 |
| 7,177,743 B2 | * | 2/2007 | Roy | B60W 50/06 |
| | | | | 706/26 |
| 7,593,796 B2 | * | 9/2009 | Prokhorov | G01M 15/042 |
| | | | | 701/29.1 |
| 8,180,544 B2 | | 5/2012 | Noffsinger et al. | |
| 8,473,127 B2 | | 6/2013 | Daum et al. | |

(Continued)

FOREIGN PATENT DOCUMENTS

| | | | | |
|---|---|---|---|---|
| JP | 2000029518 A | * | 1/2000 | ......... B60K 31/0008 |
| WO | 2009099771 | | 8/2009 | |

OTHER PUBLICATIONS

JP-2000029518-A translation (Year: 2000).*

(Continued)

*Primary Examiner* — Angelina M Shudy
(74) *Attorney, Agent, or Firm* — Studebaker & Brackett PC (57) ABSTRACT

A control system for a vehicle includes a first controller, a second controller, and an auto-tuner. The first controller is configured to generate an optimal trajectory of the vehicle along a path. The second controller is configured to, based on the optimal trajectory generated by the first controller, generate motoring and braking commands to a motoring and braking system of the vehicle for controlling the vehicle to travel along the path. The auto-tuner includes a processor configured to solve a real-time optimization problem to determine at least one parameter of at least one of the first controller or the second controller.

20 Claims, 5 Drawing Sheets

(56) References Cited

U.S. PATENT DOCUMENTS

| | | | |
|---|---|---|---|
| 8,538,611 | B2 | 9/2013 | Kumar et al. |
| 8,645,047 | B2 | 2/2014 | Daum et al. |
| 8,718,852 | B2* | 5/2014 | Weng .................. B60K 1/00 |
| | | | 180/65.265 |
| 8,788,135 | B2 | 7/2014 | Daum et al. |
| 9,205,851 | B2 | 12/2015 | Yoshimoto et al. |
| 9,292,010 | B2* | 3/2016 | Sayyarrodsari ........ G05B 17/02 |
| 9,733,625 | B2 | 8/2017 | Kumar et al. |
| 9,776,640 | B1 | 10/2017 | Tian |
| 9,925,993 | B2 | 3/2018 | Goforth et al. |
| 10,032,111 | B1* | 7/2018 | Bertram .................. G09B 9/16 |
| 10,124,784 | B2* | 11/2018 | D'Amato ............. B60W 30/16 |
| 10,209,685 | B2* | 2/2019 | Kniazev ................ G06F 17/16 |
| 10,235,818 | B2* | 3/2019 | Wang .................. G07C 5/0816 |
| 10,309,981 | B2 | 6/2019 | Wakasugi et al. |
| 11,225,228 | B2* | 1/2022 | Liu .................. B60W 60/0011 |
| 11,493,927 | B2* | 11/2022 | Green .................. B61L 3/006 |
| 11,662,730 | B2* | 5/2023 | Pan .................. H04L 67/52 |
| | | | 701/27 |
| 11,702,087 | B2* | 7/2023 | Zhu .................. B60W 50/045 |
| | | | 701/29.1 |
| 2002/0174796 | A1* | 11/2002 | Kumar .................. B60L 15/2045 |
| | | | 105/26.05 |
| 2002/0174798 | A1* | 11/2002 | Kumar .................. B60L 50/16 |
| | | | 105/50 |
| 2002/0177929 | A1* | 11/2002 | Kumar .................. B60L 50/30 |
| | | | 701/19 |
| 2003/0093209 | A1* | 5/2003 | Andersson ......... B60K 31/0058 |
| | | | 180/170 |
| 2003/0150352 | A1* | 8/2003 | Kumar .................. B60L 50/40 |
| | | | 105/35 |
| 2006/0005736 | A1* | 1/2006 | Kumar .................. B60L 15/2045 |
| | | | 105/1.4 |
| 2006/0005737 | A1* | 1/2006 | Kumar .................. B60L 50/40 |
| | | | 105/35 |
| 2006/0012320 | A1* | 1/2006 | Kumar .................. B60L 7/14 |
| | | | 318/139 |
| 2007/0219681 | A1 | 9/2007 | Kumar et al. |
| 2008/0201019 | A1 | 8/2008 | Kumar et al. |
| 2008/0270023 | A1* | 10/2008 | Kumar .................. B60L 15/2045 |
| | | | 903/903 |
| 2011/0060486 | A1 | 3/2011 | Meltser et al. |
| 2016/0016663 | A1* | 1/2016 | Stanek .................. G05D 1/0202 |
| | | | 701/3 |
| 2016/0244077 | A1* | 8/2016 | Di Cairano ......... B61L 15/0072 |
| 2017/0139423 | A1* | 5/2017 | El Ferik ............. G05B 13/048 |
| 2017/0282942 | A1* | 10/2017 | Mathews, Jr. ........ B61L 3/008 |
| 2018/0037243 | A1* | 2/2018 | Danielson .......... B60W 30/146 |
| 2018/0050711 | A1* | 2/2018 | Rice .................. B61L 15/0081 |
| 2018/0164810 | A1* | 6/2018 | Luo .................. G05D 1/0223 |
| 2018/0164822 | A1* | 6/2018 | Chu .................. G01C 21/3492 |
| 2018/0267560 | A1* | 9/2018 | Zhu .................. G05D 1/0808 |
| 2018/0339709 | A1* | 11/2018 | Tiwari .................. B60W 10/20 |
| 2019/0049967 | A1* | 2/2019 | Lim .................. G05D 1/0088 |
| 2019/0049980 | A1* | 2/2019 | Chen .................. G05D 1/0088 |
| 2019/0065933 | A1* | 2/2019 | Bogdoll ................ G06N 3/08 |
| 2019/0072960 | A1* | 3/2019 | Lin .................. B60W 40/09 |
| 2019/0079659 | A1* | 3/2019 | Adenwala .......... G06F 3/04842 |
| 2019/0097932 | A1* | 3/2019 | Buczek ................ H04L 12/413 |
| 2019/0161169 | A1* | 5/2019 | Palumbo ................ B64C 11/50 |
| 2019/0220024 | A1* | 7/2019 | Noess .................. B62D 1/283 |
| 2019/0258251 | A1* | 8/2019 | Ditty .................. G06N 3/063 |
| 2019/0369627 | A1* | 12/2019 | Green .................. B61L 27/60 |
| 2019/0375441 | A1* | 12/2019 | Green .................. B61L 25/021 |
| 2020/0173390 | A1* | 6/2020 | Shin .................. F02D 41/1406 |
| 2020/0201324 | A1* | 6/2020 | Darayan ............. G05D 1/0077 |
| 2020/0293054 | A1* | 9/2020 | George ................ G06N 20/00 |
| 2020/0333793 | A1* | 10/2020 | Schiegg ................ G06N 3/044 |
| 2021/0078588 | A1* | 3/2021 | Zhu .................. G07C 5/0808 |
| 2021/0171077 | A1* | 6/2021 | Green ................ B61L 15/0072 |
| 2021/0221386 | A1* | 7/2021 | Quirynen .......... G05D 1/0217 |
| 2021/0263527 | A1* | 8/2021 | Yazhemsky ............ G06N 3/04 |
| 2021/0323564 | A1* | 10/2021 | Wang .................. B62D 6/002 |
| 2022/0080585 | A1* | 3/2022 | Nishimura .......... G05D 1/0214 |
| 2022/0097728 | A1* | 3/2022 | Lin .................. G06N 20/00 |

OTHER PUBLICATIONS

Y. Kebbati, N. Ait-Oufroukh, V. Vigneron, D. Ichalal and D. Gruyer, "Optimized self-adaptive PID speed control for autonomous vehicles," 2021 26th International Conference on Automation and Computing (ICAC), Portsmouth, United Kingdom, 2021, pp. 1-6, doi: 10.23919/ICAC50006.2021.9594131. (Year: 2021).*

Neural Speed Control for Autonomous Road Vehicles 1995 (Year: 1995).*

Farag, W. Complex Trajectory Tracking Using PID Control for Autonomous Driving. Int. J. ITS Res. 18, 356-366 (2020). (Year: 2020).*

Longitudinal speed control of autonomous vehicle based on a self-adaptive PID of radial basis function neural network, Nie et al, 2018 (Year: 2018).*

Yazhemsky, Dennis, et al, "An On-Line Optimal Controller for a Commuter Train", IEEE Transactions on Intelligent Transportation Systems, vol. 20, No. 3, Mar. 2019, pp. 1112-1125.

A. Albrecht, P. Howlett, P. Pudney, X. Vu, and P. Zhou, "The key principles of optimal train control—part 1: Formulation of the model, strategies of optimal type, evolutionary lines, location of optimal switching points," Transportation Research Part B: Methodological, vol. 94, pp. 482-508, 2016, ISSN : 0191-2615.]].

* cited by examiner

CONTROLLER, CONTROL SYSTEM AND METHOD FOR VEHICLE CONTROL

PRIORITY CLAIM AND CROSS-REFERENCE

The present application claims the priority benefit of U.S. Provisional Patent Application No. 62/980,694, filed Feb. 24, 2020, the entirety of which is hereby incorporated by reference.

BACKGROUND

Commuter train networks represent a rapidly growing industry. This rapid growth of rail commuter transit is accompanied by development of Automatic Train Operation (ATO) systems. Overall objectives of these systems are to reduce energy consumption and overall vehicle CO2 emission, improve timetable adherence, lessen wear-and-tear on train drive trains, ensure safe and robust system failure detection and fast subsequent response, and minimize the energy expenditure for a given trip.

BRIEF DESCRIPTION OF THE DRAWINGS

One or more embodiments are illustrated by way of example, and not by limitation, in the figures of the accompanying drawings, wherein elements having the same reference numeral designations represent like elements throughout. It is emphasized that, in accordance with standard practice in the industry various features may not be drawn to scale and are used for illustration purposes only. In fact, the dimensions of the various features in the drawings may be arbitrarily increased or reduced for clarity of discussion.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation or position of a first feature over or on a second feature in the description that follows may include embodiments in which the first and second features are formed or positioned in direct contact, and may also include embodiments in which additional features may be formed or positioned between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of an apparatus, object in use or operation, or objects scanned in a three dimensional space, in addition to the orientation thereof depicted in the figures. The apparatus may be otherwise oriented (rotated 90 degrees or at other orientations) and the spatially relative descriptors used herein may likewise be interpreted accordingly.

In some embodiments, a control system of a vehicle includes a two-loop architecture. An outer-loop controller determines optimal speed, acceleration and/or jerk profiles to achieve optimization goals. An inner-loop controller determines optimal motoring and braking commands to achieve the optimal speed, acceleration and/or jerk profiles. The two separate controllers are further optimized via a real-time self-tuning process or controller that learns the vehicle's response and adapts the control system to improve performance.

Figure 1:
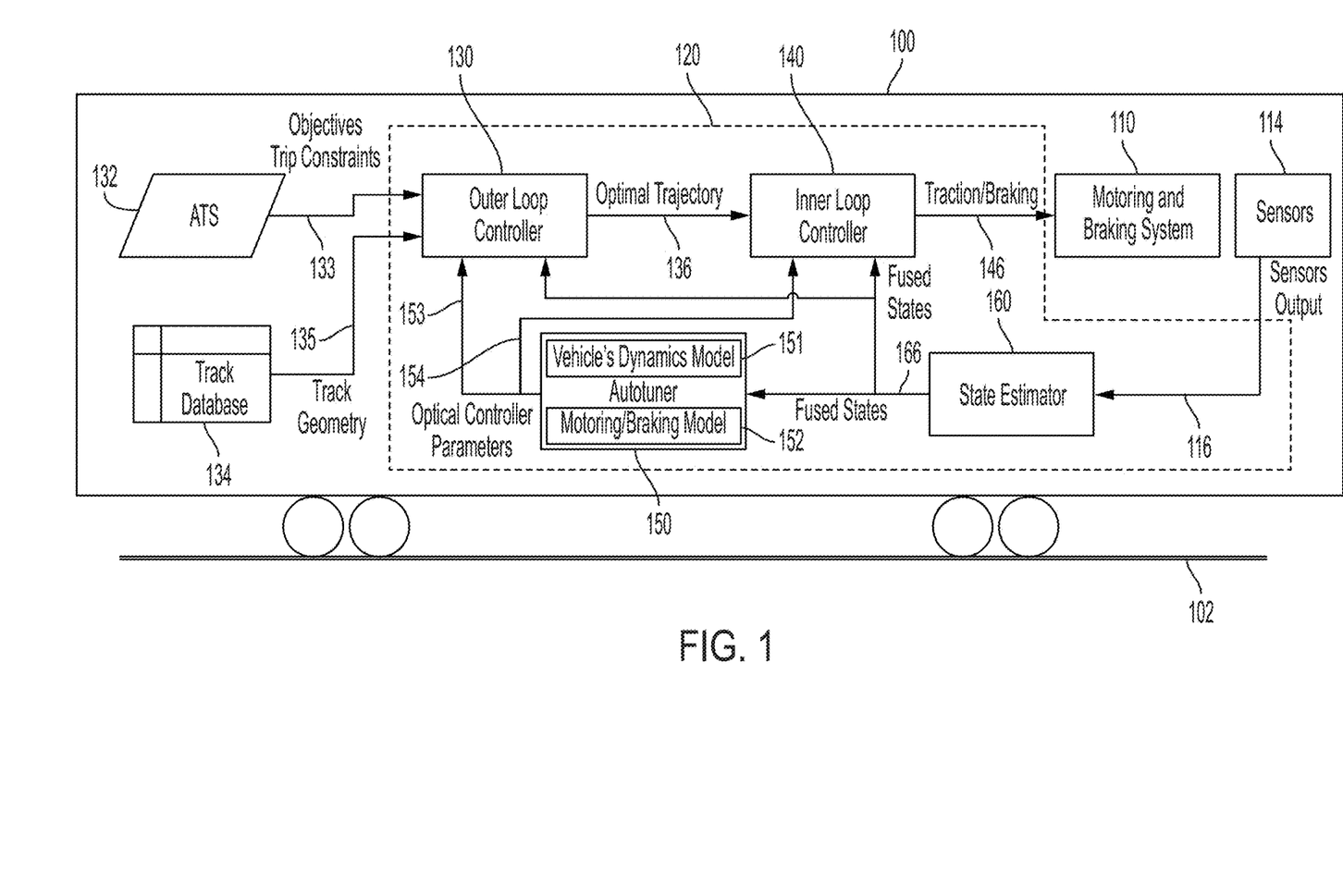
FIG. 1 is a schematic diagram of a vehicle having a control system in accordance with some embodiments.

FIG. 1 is a schematic diagram of a vehicle 100 having a control system in accordance with some embodiments.

The vehicle 100 is configured to travel along a path 102. In some embodiments, the vehicle 100 is configured to transport people and/or cargo. Examples of the vehicle 100 include, but are not limited to, subway trains, commuter trains, freight trains, street cars, mass transit guided vehicles, autonomous vehicles, or the like. In some embodiments, the path 102 is a guideway. Examples of a guideway include, but are not limited to, is a track, rail, roadway, cable, series of reflectors, series of signs, a visible or invisible path, a projected path, a laser-guided path, a global positioning system (GPS)-directed path, an object-studded path or other suitable format of guide, path, track, road or the like on which, over which, below which, beside which, or along which a vehicle is caused to travel. In some embodiments, the vehicle 100 is a railway vehicle, such as, a train. While trains are a practical application of some embodiments, at least one embodiment has a practical application in road vehicles, such as autonomous cars. In some embodiments, the vehicle 100 comprises one or more autonomous cars travelling on a guideway, especially in the form of a fleet of vehicle one following another.

The vehicle 100 comprises a motoring and braking system 110 configured to drive or move the vehicle 100 along the path 102. The motoring and braking system 110 includes at least one propulsion source configured to generate a force or acceleration to move the vehicle 100 along the path 102. Examples of a propulsion source include, but are not limited to, an engine or an electric motor. In some embodiments, the at least one propulsion source is also referred to as a motoring system of the vehicle 100. The motoring and braking system 110 further comprises at least one break for decelerating and stopping the vehicle 100. In some embodiments, the at least one brake is also referred to as a braking system of the vehicle 100. Other movements of the vehicle 100 are also effected by the motoring and braking system 110 in various embodiments. For example, in embodiments where steering of the vehicle 100 (e.g., a road vehicle) is possible, the motoring and braking system 110 also includes a steering mechanism for steering the vehicle 100.

The vehicle 100 further comprises a plurality of sensors 114 configured to provide sensor data or sensor output for one or more controllers described herein to control movement of the vehicle 100. The sensor data provided by the sensors 114 comprise measured or detected values of a plurality of parameters. Example parameters include, but are not limited to, a current speed of the vehicle 100, a current position of the vehicle 100 on the path 102, a current acceleration (or deceleration) of the vehicle 100, or the like. To detect or measure values of the parameters, the sensors 114 comprise one or more corresponding sensors. For example, to detect or measure the speed of the vehicle 100, the sensors 114 comprise one or more speed sensors including, but not limited to, a Doppler radar, a camera (video odometry), Light Detection And Ranging (LiDAR) equipment, or the like. For another example, to detect or measure the position of the vehicle 100 on the path 102, the sensors 114 comprise one or more position sensors including, but not limited to, a camera, a radar, a LiDAR scanner, a radio frequency (RF) transceiver, or the like, for reading corresponding visible, radar, LiDAR or RF data embedded in one or more signs arranged along the path 102, in an arrangement known as a communication based train control (CBTC) system. For a further example, to detect or measure the acceleration (or deceleration) of the vehicle 100, the sensors 114 comprise one or more acceleration sensors or Inertial Measurement Unit (IMU) sensors configured to measure the 3-D specific force and angular rate of the vehicle. Other parameters to be measured or detected, and the corresponding sensors for measuring or detecting such parameters, are within the scopes of various embodiments.

The vehicle 100 further comprises a control system 120 configured to control the motoring and braking system 110 to drive or move the vehicle 100 to travel along the path 102. In the example configuration in FIG. 1, the control system 120 comprises a first controller 130, a second controller 140, an auto-tuner 150, and a state estimator 160. In some embodiments, the first controller is referred to as the outer-loop controller, and the second controller is referred to as the inner-loop controller. In some embodiments, each of the outer-loop controller 130, inner-loop controller 140, auto-tuner 150, and state estimator 160 comprises at least one processor, or a computing platform as described with respect to FIG. 5, wherein the processor or computer platform is configured to perform the corresponding functionality described herein. In at least one embodiment, a portion or the whole of the control system 120 is implemented as part of a vehicle on-board controller (VOBC) of the vehicle 100. For example, the control system 120 is implemented at least in part by one or more processors of the VOBC which is/are programmed or hard-wired to perform at least some, or all, operations or functionality of the control system 120 described herein. In at least one embodiment, the control system 120 is implemented in hardware separate from the VOBC of the vehicle 100. For example, the control system 120 is implemented at least in part by at least one processor outside the VOBC and programmed to perform some, or all, operations or functionality of the control system 120 described herein.

In some embodiments, the outer-loop controller 130 is configured to generate an optimal trajectory 136 of the vehicle 100 along the path 102. The inner-loop controller 140 is configured to, based on the optimal trajectory 136 generated by the outer-loop controller 130, generate motoring and braking commands 146 to the motoring and braking system 110 of the vehicle 100 for controlling the vehicle 100 to travel along the path 102. The auto-tuner 150 is configured to solve a real-time optimization problem to determine at least one parameter of at least one of the outer-loop controller 130 or the inner-loop controller 140.

In some embodiments, the outer-loop controller 130 comprises an optimal controller. Examples of an optimal controller comprises an optimal adaptive controller as described with respect to FIG. 3, a self-learning controller as described with respect to FIG. 4, or the like. In at least one embodiment, optimal control involves treating a control problem as a model-based optimization problem where the control law is computed through optimizing a given objective for a known process model (the model of the system, e.g., a vehicle, being controlled) under the presence of one or more constraints. For example, the outer-loop controller 130 is configured to solve an optimization problem based on a current state of the vehicle 100, at least one control or optimization objective, and at least one constraint.

Examples of optimization objectives of the outer-loop controller 130 include, but are not limited to, time to arrive to the next platform, station or intended stopping point (e.g., minimum time), energy spent to arrive to the next platform, station or intended stopping point (e.g., minimum energy), time to complete the whole travel or run (e.g., minimum time), energy spent in the whole travel or run (e.g., minimum energy), stopping accuracy (e.g., minimum stopping error), minimized jerk, minimized relay wear and tear, or the like.

Examples of constraints imposed on the outer-loop controller 130 include, but are not limited to, speed limitation (e.g., minimum speed and/or maximum speed permitted), acceleration limitation (e.g., maximum acceleration/deceleration and/or minimum acceleration/deceleration permitted), jerk limitation (e.g., minimum jerk and/or maximum jerk permitted), arrival time to a platform, maximum not to exceed energy spent, stopping accuracy (e.g., maximum allowed stopping error), or the like.

Examples of optimization problems to be solved by the outer-loop controller 130 include, but are not limited to, determining a driving trajectory necessary for driving the vehicle from platform to platform (or from one intended stopping point to the next), determining whether the objective(s) is feasible given the constraint(s), determining the optimal position, velocity and acceleration profile that satisfies the given constraint(s).

In some embodiments, to enable the outer-loop controller 130 to perform optimal control, inputs to the outer-loop controller 130 comprise one or more of an optimization goal or goals, a constraint or constraints, a current position of the vehicle, current speed and direction of the vehicle, a current acceleration of the vehicle, an intended stopping point of the vehicle, a track geometry from the current position to the intended stopping point, and a simplified motoring and braking model of the vehicle. In some embodiments, a motoring and braking model, i.e., a model of the motoring and braking system 110, is typically a complex control system that is usable by the inner-loop controller 140 to generate motoring and braking commands 146 as described herein. Examples of complexities that the inner-loop controller 140 is configured to handle include, but are not limited to, (a) reaction or engagement time resulting in a delay from the instance the motoring/braking command was issued until the instance it is engaged, (b) build time or buildup time resulting in a further delay until the commanded motoring/braking effort is fully implemented, (c) failures in the motoring and braking system, such as propulsion run away, braking effort less than the nominal specified, or motoring effort less than the nominal specified, or the like. In at least one embodiment, the outer-loop controller 130 generates the optimal trajectory 136, using a more "ideal," or simplified, motoring and braking model in which one or more of the complexities of the motoring and braking model handled by the inner-loop controller 140 is/are omitted or disregarded.

In the example configuration in FIG. 1, at least one control objective and/or at least one constraint (collectively designated at 133 in FIG. 1) is/are input to the outer-loop controller 130 from Automatic Train Supervision (ATS) 132. In at least one embodiment, ATS 132 is a ground-based controller or computer platform which transmits the at least one control objective and/or at least one constraint to the control system 120 over a network. In some embodiments, at least one control objective and/or at least one constraint is/are input on board the vehicle 100, e.g., via a user interface. In some embodiments, at least one control objective and/or at least one constraint is/are built-in the outer-loop controller 130.

In the example configuration in FIG. 1, a track geometry 135 from the vehicle's current position to the intended stopping point is input into the outer-loop controller 130 from a guideway database or track database 134. Examples of track geometry include, but are not limited to, grade, radii of curvature, or the like. In at least one embodiment, the track database 134 is maintained in a computer readable medium in a ground-based controller and the track geometry is transmitted from track database 134 to the control system 120 over a network. In some embodiments, the track database 134 is available on board the vehicle 100.

In some embodiments, one or more of a current position, a current speed, a current direction, and a current acceleration of the vehicle is/are input from corresponding positioning and/or odometry functions of the control system 120. In the example configuration in FIG. 1, the positioning and/or odometry functions are performed, partially or wholly, by a processor of the state estimator 160 based on the sensor output or sensor data 116 received from the from sensors 114. The odometry function is a function in which the state estimator 160 is configured to determine the speed, direction and acceleration of the vehicle 100. The positioning function is a function in which the state estimator 160 is configured to determine the position of the vehicle 100 on the path 102, e.g., a guideway or road, and the orientation of the vehicle 100 on the guideway or road. Examples of sensors 114 that support the positioning and/or odometry function(s) include, but are not limited to, Radio Frequency Identification (RFID) transponder, tachometer, single axis accelerometer, Wireless Fidelity (WiFi) sensor, Ultra Wide Band (UWB) sensor, RAdio Detection And Ranging (Radar) sensor, Inertial Measurement Unit (IMU) sensor, or the like. One or more of the current position, speed, direction, and acceleration of the vehicle, which correspond to the current state of the vehicle and are collective designated as fused states 166 in FIG. 1, is/are output from the state estimator 160 to the outer-loop controller 130, inner-loop controller 140, auto-tuner 150. In at least one embodiment, the state estimator 160 is configured to provide high accuracy positioning, speed, acceleration and/or jerk states, and to eliminate biases for the auto-tuner 150 and both of the outer-loop controller 130 and inner-loop controller 140. In at least one embodiment, the state estimator 160 is omitted or incorporated in the auto-tuner 150.

In some embodiments, an intended stopping point of the vehicle is retrieved from a mission planning function of the control system 120 and/or input from a ground-based controller or via a user interface. In at least one embodiment, a first model 151 of motion dynamics of the vehicle 100, or one or more parameters of the first model 151 (also referred to herein as vehicle's dynamics model) is/are input from the auto-tuner 150 to the outer-loop controller 130. The outer-loop controller 130 is configured to use the vehicle's dynamics model 151 and/or the one or more parameters of the vehicle's dynamics model 151 to generate an optimal trajectory 136 as described herein.

The outer-loop controller 130 is configured to obtain the optimal trajectory 136 of the vehicle 100 by solving an optimization problem to achieve at least one control objective under one or more constraints, as described herein. The optimal trajectory 136 is output by the outer-loop controller 130 to the inner-loop controller 140. In some embodiments, the outer-loop controller 130 is configured to, at each node among a plurality of nodes along the path 102, based on the current state of the vehicle, generate the optimal trajectory 136 as travel plan for a remainder of the path 102 from a current position of the vehicle to a target location, e.g., the intended stopping point. The process is then repeated at a subsequent node until the target location is reached. In some embodiments, the optimal trajectory 136 comprises an optimal profile or trajectory of at least one of speed, acceleration or jerk (i.e., the rate at which the acceleration changes with respect to time) of the vehicle along the path. For example, the optimal trajectory 136 comprises one or more of a speed trajectory in the time domain (i.e., speed vs. time) to the intended stopping point, a speed trajectory in the position domain (i.e., speed vs. position) to the intended stopping point, an acceleration trajectory in the time domain (i.e., acceleration vs. time) to the intended stopping point, an acceleration trajectory in the position domain (i.e., acceleration vs. position) to the intended stopping point, a jerk trajectory in the time domain (i.e., jerk vs. time) to the intended stopping point, a jerk trajectory in the position domain (i.e., jerk vs. position) to the intended stopping point, or the like.

In some embodiments, the inner-loop controller 140 comprises an optimal adaptive control, a neural network machine learning controller, or another type of controller such as a gain scheduled Proportional-Integral-Derivative (PID) controller. An example of an optimal adaptive controller is described with respect to FIG. 3. An example of a self-learning controller (or neural network machine learning controller) is described with respect to FIG. 4.

The inner-loop controller 140 is configured to receive the optimal trajectory 136 from the outer-loop controller 130 and generate the motoring and braking commands 146 to the motoring and braking system 110 of the vehicle 100 to control the motoring and braking system 110 to drive or move the vehicle 100 to travel along the path 102 in accordance with the optimal trajectory 136. In some embodiments, the inner-loop controller 140 is configured to generate the motoring and braking commands 146 so as to minimize state errors from the optimal trajectory 136. In other words, the inner-loop controller 140 is configured to command the motoring and braking system 110 such that the error to the supplied optimal trajectory 136 is minimized.

Examples of constraints imposed on the inner-loop controller 140 include, but are not limited to, a maximum not to exceed number of motoring-to-braking transitions, a maximum not to exceed number of braking-to-motoring transitions, a minimal duration of the motoring stage, a minimal duration of the braking stage, a delay of the motoring system, a delay of the braking system, invalid control regions, or the like. In some embodiments, at least one constraint imposed on the inner-loop controller 140 and/or the control objective of minimizing the state error is/are input to the second sensor set 140 from the mission planning function of the control system 120 and/or input from a ground-based controller or via a user interface.

In at least one embodiment, a second model 152 of the motoring and braking system 110 of the vehicle 100, or one or more parameters of the second model 152 (also referred to herein as motoring and braking model) is/are input from the auto-tuner 150 to the inner-loop controller 140. The inner-loop controller 140 is configured to use the motoring and braking model 152 and/or the one or more parameters of the motoring and braking model 152 to generate the motoring and braking commands 146 as described herein. Further inputs to the inner-loop controller 140 comprise the fused states (current state) 166 form the state estimator 160.

In at least one embodiment, the inner-loop controller 140 does not need to know or use the whole optimal trajectory 136 from the current position to the intended stopping point. Instead, the inner-loop controller 140 needs to know or use just a relevant part of the optimal trajectory 136 from the current position to the next node among a plurality of nodes determined in the time domain or position domain along the path 102. Therefore, in one or more embodiments, the outer-loop controller 130 provides just the relevant part, instead of the entirety, of the optimal trajectory 136 to the inner-loop controller 140. Alternatively, in at least one embodiment, the outer-loop controller 130 provides the whole optimal trajectory 136 to the inner-loop controller 140 which uses just the relevant part to generate the motoring and braking commands 146.

The auto-tuner 150 is configured to optimize or tune at least one of the outer-loop controller 130 or inner-loop controller 140. In some embodiments, the auto-tuner 150 is configured to optimize or tune at least one of the outer-loop controller 130 or inner-loop controller 140 by solving an optimization problem.

Examples of constraints imposed on the auto-tuner 150 include, but are not limited to, a maximum error between a simulated drive of the vehicle 100 in accordance with the vehicle's dynamics model 151 and an actual drive of the vehicle 100, a maximum error between a simulated operation of the motoring and braking system 110 in accordance with the motoring and braking model 152 and an actual operation of the motoring and braking system 110, maximum and minimum values of at least one parameter of the vehicle's dynamics model 151 or the motoring and braking model 152 being tuned, or the like.

In some embodiments, the vehicle's dynamics model 151 comprises one or more equations for calculating or simulating at least one of position, speed, acceleration, or jerk of the vehicle as a function or functions of one or more of speed, vertical radii of curvature, horizontal radii of curvature, bank angle (or superelevation), acceleration and its dependency on speed, deceleration using different types of brakes, instantaneous jerk, or the like.

In some embodiments, the motoring and braking model 152 comprises a model of the motoring system and a model of the braking system. In at least one embodiment, a model of the motoring system comprises one or more equations for calculating or simulating a propulsion force of the motoring system as a function or functions of one or more of engagement time (time elapsed since the command was issued until the motoring system start building the motoring effort), buildup time (time elapsed since the commanded motoring effort starts building up until it is fully built), cutoff time (time elapsed since the cutoff command is issued until the motoring is fully cutoff), or the like.

In at least one embodiment, a model of the braking system comprises one or more equations for calculating or simulating a braking force of the braking system as a function or functions of one or more of engagement time (time elapsed since the command was issued until the motoring system is cutoff), buildup time (time elapsed since the motoring is cutoff and the braking effort starts building up until it is fully built), cutoff time (time elapsed since the cutoff command is issued until the braking is fully cutoff), or the like. Examples of a model of the braking system include, but are not limited to, a model of the vehicle's dynamic braking system, a model of the vehicle's friction braking system, a model of the vehicle's service braking system, a model of a regenerative braking system of the vehicle, a model of the vehicle's emergency braking system, or the like.

Each of the vehicle's dynamics model 151, motoring and braking model 152 comprises one or more parameters which are adjustable, changeable or tunable to modify the result of the simulation using the model to achieve an optimized or optimal model.

In some embodiments, operations of the auto-tuner 150 comprise a self-training mode and a tuning (or normal) mode. The self-training mode is sometimes referred to as "creation of the vehicle's models" mode and reflects self-training capability of creating the vehicle's dynamics model 151 and/or the motoring and braking model 152 in which the speed, acceleration and/or jerk response to certain motoring and/or braking commands is characterized.

In some embodiments, the self-training mode is operated when at least one of the vehicle's dynamics model 151 or motoring and braking model 152, and/or when at least one parameter of the model(s), is/are unknown. In the self-training mode, the auto-tuner 150 is configured to instruct the inner-loop controller 140 to generate randomized or predetermined motoring and braking commands (herein referred to as training motoring and braking commands) to the motoring and braking system 110, for estimating at least one parameter of at least one of the vehicle's dynamics model 151 or the motoring and braking model 152. In at least one embodiment, training motoring and braking commands are generated by the inner-loop controller 140 without input or control or a trajectory from the outer-loop controller 130. Responses of the vehicle 100 and/or the motoring and braking system 110 to the training motoring and braking commands are collected by the sensors 114 and output from the sensors 114 as sensor data 116, which are processed by the state estimator 160 and output as fused states 166 from the state estimator 160 to the auto-tuner 150. In an example, the speed, acceleration and/or jerk of the vehicle 100 in response to a motoring step increase from 20% motoring effort to 50% motoring effort is collected. In another example, the speed, acceleration and/or jerk of the vehicle 100 in response to a braking step increase from 0% braking effort to 70% braking effort is collected. In a further example, the speed, acceleration and/or jerk of the vehicle 100 in response to a motoring ramp from 20% motoring effort to 70% motoring effort in a specified duration is collected. In other words, the control space (e.g., motoring and braking efforts and the corresponding speed, acceleration and/or jerk response) is "swept" to gather enough data to accurately determine or estimate parameters of the vehicle's dynamics model 151 for the outer-loop controller 130 and/or the motoring and braking model 152 for the inner-loop controller 140. Other training motoring and braking commands and collected responses are within the scopes of various embodiments.

Based on the training motoring and braking commands and the corresponding responses of the vehicle 100 and/or the motoring and braking system 110, the auto-tuner 150 is configured to estimate at least one parameter of at least one of the vehicle's dynamics model 151 or the motoring and braking model 152. For example, to create a braking system model, the auto-tuner 150 is configured to select braking data, including training braking commands and the corresponding responses, and execute an optimization problem to be solved for one or more parameters of the braking system model. In at least one embodiment, the optimization problem is solved to minimize an error between a simulated response calculated by the model and the actual response collected through the sensors 114. As more data (i.e., training motoring and braking commands and corresponding responses) are collected, the estimated parameters or models become more accurate, and the corresponding outer-loop controller 130, inner-loop controller 140 will have better control of the vehicle 100.

When the model parameters are estimated and the models become known, the auto-tuner 150 is configured to instruct the inner-loop controller 140 to exist the self-training mode and return to a normal mode where the inner-loop controller 140 generates motoring and braking commands 146 based on an optimal trajectory 136 provided from the outer-loop controller 130. In at least one embodiment, the auto-tuner 150 is configured to provide at least one of the now known vehicle's dynamics model 151 or motoring and braking model 152 to the corresponding outer-loop controller 130, inner-loop controller 140 to enable the controllers to use the corresponding models to generate the optimal trajectory 136 and/or the motoring and braking commands 146 for controlling the vehicle 100 to travel along the path 102.

In some embodiments, the self-training mode is omitted, for example, when the vehicle's dynamics model 151 and/or motoring and braking model 152 is/are already included or built-in the corresponding outer-loop controller 130 and/or inner-loop controller 140.

In the tuning or normal mode, the auto-tuner 150 is configured to, while the vehicle 100 is traveling along the path 102, repeatedly solve a real-time optimization problem to optimize at least one parameter of at least one of the vehicle's dynamics model 151 or the motoring and braking model 152. In at least one embodiment, the optimization problem to be solved in the tuning mode for parameter optimization is the same as the optimization problem that was solved in the self-training mode for parameter estimation. For example, the auto-tuner 150 compares the fused states 166 (i.e., actual state) with a corresponding simulated state calculated by the vehicle's dynamics model 151 or motoring and braking model 152, and adjusts, modifies, or optimizes one or more parameters of at least one of the models 151, 152 to minimize the error between the simulated state and the actual state. The optimized one or more parameters is/are then used to update or tune the corresponding controllers 130, 140.

In some embodiments, the manner in which the outer-loop controller 130 and/or inner-loop controller 140 is/are updated or tuned by the auto-tuner 150 corresponds to the type or configuration of the corresponding controller(s). For example, the outer-loop controller 130 in at least one embodiment comprises an optimal model based controller, and one or more parameters of the vehicle's dynamics model 151 optimally estimated or optimized by the auto-tuner 150 is/are directly updated in the vehicle's dynamics model 151 included in the outer-loop controller 130. Similarly, in one or more embodiments where the inner-loop controller 140 comprises a model predictive controller or an optimal model based controller, the auto-tuner 150 is configured to simply change or update one or more parameters of the motoring and braking model 152 included in the inner-loop controller 140 to the corresponding optimally estimated or optimized parameters.

In one or more embodiments where the outer-loop controller 130 and/or inner-loop controller 140 comprise(s) a neural network based controller, the auto-tuner 150 is configured to train the outer-loop controller 130 and/or inner-loop controller 140 using a neural network and the corresponding optimized vehicle's dynamics model 151 and/or motoring and braking model 152. An example of a training process is described with respect to FIG. 4.

In one or more embodiments where the inner-loop controller 140 is a PID controller, the inner-loop controller 140 is configured to perform a non-linear optimization and tune the PID in simulation with the optimized motoring and braking model 152.

In some embodiments, the described optimization of the vehicle's dynamics model 151, motoring and braking model 152 and/or the tuning of the outer-loop controller 130 and inner-loop controller 140 are performed in real-time and/or repeatedly as the vehicle 100 travels along the path 102. In an example, the described optimization and/or tuning are performed periodically, or at one or more or at each of the plurality of nodes along the path 102.

A practical application of some embodiments is CBTC systems configured to operate in ATO, driverless or unattended modes of operation where the VOBC commands the requested propulsion and braking effort along with coasting to the vehicle's control systems. A further application of some embodiments includes off-line speed profile generation to improve the capabilities of existing speed controllers. In addition, the control system in one or more embodiments is configured to be used for larger scale control room routing and management of complete vehicle fleets or other mobile logistical planning. While trains are a practical application of some embodiments, at least one embodiment has a practical application in road vehicles, such as autonomous cars, travelling on a guideway, especially in the form of a fleet of vehicle one following another.

Compared to alternative approaches, one or more embodiments provide one or more advantages discussed herein. Specifically, control methods for automatic vehicle control in an alternative approach mostly involve collections of ad-hoc techniques which are tuned to a specific vehicle. The underlying architecture is usually a linear controller that is not designed for non-linear systems, and it is usually patched with other ad-hoc techniques to work to an acceptable level in an advanced non-linear system. This patch-on-patch design model for a controller is neither sustainable nor robust. To address one or more concerns observed in the ad-hoc techniques, an alternative approach involves controllers based on optimal control. Such optimal controllers largely suffer from the inability to solve the control law fast enough to be usable as automatic speed controller. Further, optimal controllers in the alternative approach are only optimal assuming that the process model is well understood. This assumption may not hold, i.e., the controller may not be optimal, in situations where the dynamics of a motoring/braking system are difficult to model.

In contrast, one or more embodiments make it possible to optimize multiple controllers working in concert to control a vehicle, e.g., a rail vehicle, where position, speed, acceleration and jerk of the vehicle are controlled to meet a certain optimization objective or objectives in consideration of certain constraint or constraints. For example the multiple controllers include an outer-loop controller responsible to planning the vehicle's optimal trajectory, an inner-loop controller responsible to issue motoring and braking commands, and an auto-tuner responsible to tune both outer-loop and inner-loop controllers to achieve a robust control system which is configured to achieve real-time automatic and optimal position, speed, acceleration and jerk control of a vehicle, in particular a rail vehicle.

In at least one embodiment, the outer-loop controller and/or the inner-loop controller are configured to determine the mathematically most optimal course action for the vehicle to achieve the optimization goal and in consideration of certain constraint or constraints. In the case that the specified constraint or constraints are feasible, it is possible in one or more embodiments to mathematically guarantee that the control law will adhere to these constraints satisfying the optimization goal. Such capabilities are not available to control systems in alternative approaches.

In at least one embodiment, the outer-loop controller and the inner-loop controller are two separate controllers. For example, the outer-loop controller and the inner-loop controller are implemented by two different processors or by two different computer platforms as described herein. As such, the control is solved in two loops, i.e., the outer-loop which determines the optimal speed, acceleration and jerk profiles to achieve the optimization goals, and the inner-loop which determines the optimal motoring and braking commands to achieve the optimal speed, acceleration and jerk profiles in consideration of further constraints imposed on the inner-loop controller. The two controllers are further optimized via a real-time self-tuning process performed by the auto-tuner that learns the vehicle's response and adapts the control system to improve performance.

In one or more embodiments, partitioning the control problem into multiple controllers breaks the problem into multiple stages while each stage is optimized by its own, i.e., the outer-loop controller is configured to solve the mission planning stage optimization problem in real-time where control output of the outer-loop controller is not expected to change rapidly with time, while the inner-loop controller is configured to solve the actuator optimization problem in-real-time which control output of the outer-loop controller may change more rapidly, as compared to the outer-loop controller, with time. This simplifies the complex task of driving the vehicle into two relatively simple controllers.

In contrast, control methods of railway vehicles in accordance with some alternative approaches are ad-hoc designed, hard to tune, suboptimal, and may not mathematically guarantee adherence to driving constraints. More advanced optimal controllers in accordance with further alternative approaches attempt to mitigate these issues, but suffer from being computationally inefficient and often take on the order of hundreds of seconds to come up with a control solution whereas an Automatic Speed Control (ASC) in ATO operations needs to operate at frequencies in the order of 10 Hz. Optimal control methods controllers in accordance with further alternative approaches also suffer from being completely dependent on accurate knowledge of the full vehicle process. This is not necessary in one or more embodiments as only a fraction of the vehicle dynamics are needed for the outer loop controller, and some of the modeling complexity can be transferred to the inner loop controller. As a result, in at least one embodiment, it is possible to control the vehicle to achieve goals defined by the operator or ATS while satisfying defined constraints in a driverless or unattended modes of operation. In at least one embodiment, the control system repeats optimization each and every control cycle in real-time and returns a solution at frequencies on the order of 10 Hz, or faster.

In some embodiments, the outer-loop controller is configured to provide an optimal mission planning trajectory for the inner-loop controller (also referred to as traction controller) to follow. The optimal outer-loop controller plans the mission to achieve an optimization goal such as time to arrive to the next platform, energy spent to arrive to next platform, time to complete the whole run, stopping accuracy, and/or energy spent in the whole run. The optimization problem is attempted to be solved by the outer-loop controller based on constraints provided by the ATS, track database information (such as grade and radii of curvature) and the current system states (such as position, speed and acceleration). The outer-loop controller's objective is to provide a reference trajectory based on a good understanding of the vehicle's dynamics model, the tracks geometry, constraints and optimization goals (objectives) provided by the ATS.

In some embodiments, the inner-loop controller is configured to follow the optimal mission planning provided by the outer-loop controller (i.e., position, speed, acceleration and jerk profiles) to provide fine motoring/braking commands to the vehicle satisfying a control goal or goals (such as, minimum number of motoring to braking transitions and/or minimum number of braking to motoring transitions) and imposed constraints (such as, maximum not to exceed number of motoring to braking transitions and/or maximum not to exceed number of braking to motoring transitions and/or minimum braking effort and/or minimum motoring effort). The inner loop controller has a good understanding of the vehicle's motoring and braking system and needs just limited understanding of the planed trajectory including the trip (run) model, the tracks geometry, the ATS constraints, and the outer-loop controller's optimization goals (objectives).

The described cascaded or nested architecture of the outer-loop controller and inner-loop controller allows to decouple the high level control objectives (trajectory planning) and the low level control objectives (motoring and braking efforts), and make the two controllers, working in concert, achieving an optimal, easy to tune, and highly adaptive ASC function, in one or more embodiments. The described cascaded or nested architecture in accordance with some embodiments is more effective than having a single unified controller, because it is significantly easier and more efficient to achieve an optimal ASC with multiple controllers (i.e., outer-loop controller and inner-loop controller) in which each controller is responsible to optimize a simpler objective as opposed to having a global/unified controller that must optimize a more complex generic objective.

In some embodiments, the auto-tuner is configured to solve a real-time optimization problem to determine the vehicle parameters needed to model the vehicle performance (i.e., the vehicle motoring and braking model). The auto-tuner is further configured to retune the outer-loop and inner-loop controllers based on the vehicle's model and a predetermined driving scenario portfolio. For example, the auto-tuner is configured to tune the outer-loop controller in real-time as the vehicle moves along the path or guideway. The auto-tuner comprises an optimal parameter estimator configured to estimate the vehicle dynamics model based on driving behavior and then creates simulated parametric models for the vehicle's dynamics in the outer-loop controller, the motoring system in the inner-loop controller, and the braking system in the inner-loop controller.

In at least one embodiment, it is possible to achieve real-time optimal and adaptive control of the vehicle to achieve objective goals while satisfying defined constraints.

One or more embodiments also allow faster and more efficient deployment of the automatic speed control (i.e., auto-pilot) in the field, due to the self-tuned outer-loop controller and the self-tuned inner-loop controller architecture. Some embodiments provide one or more of significant energy savings and guaranteed timetable adherence along due to optimal constrained driving, greatly reduced tuning efforts for deployment in the field, a self-tuning and internal optimization strategy which permits the controllers to adapt to the vehicle without deterioration in the controllers' performance as the vehicle ages. One or more of these capabilities and/or advantages are not available in the described alternative approaches.

Figure 2:
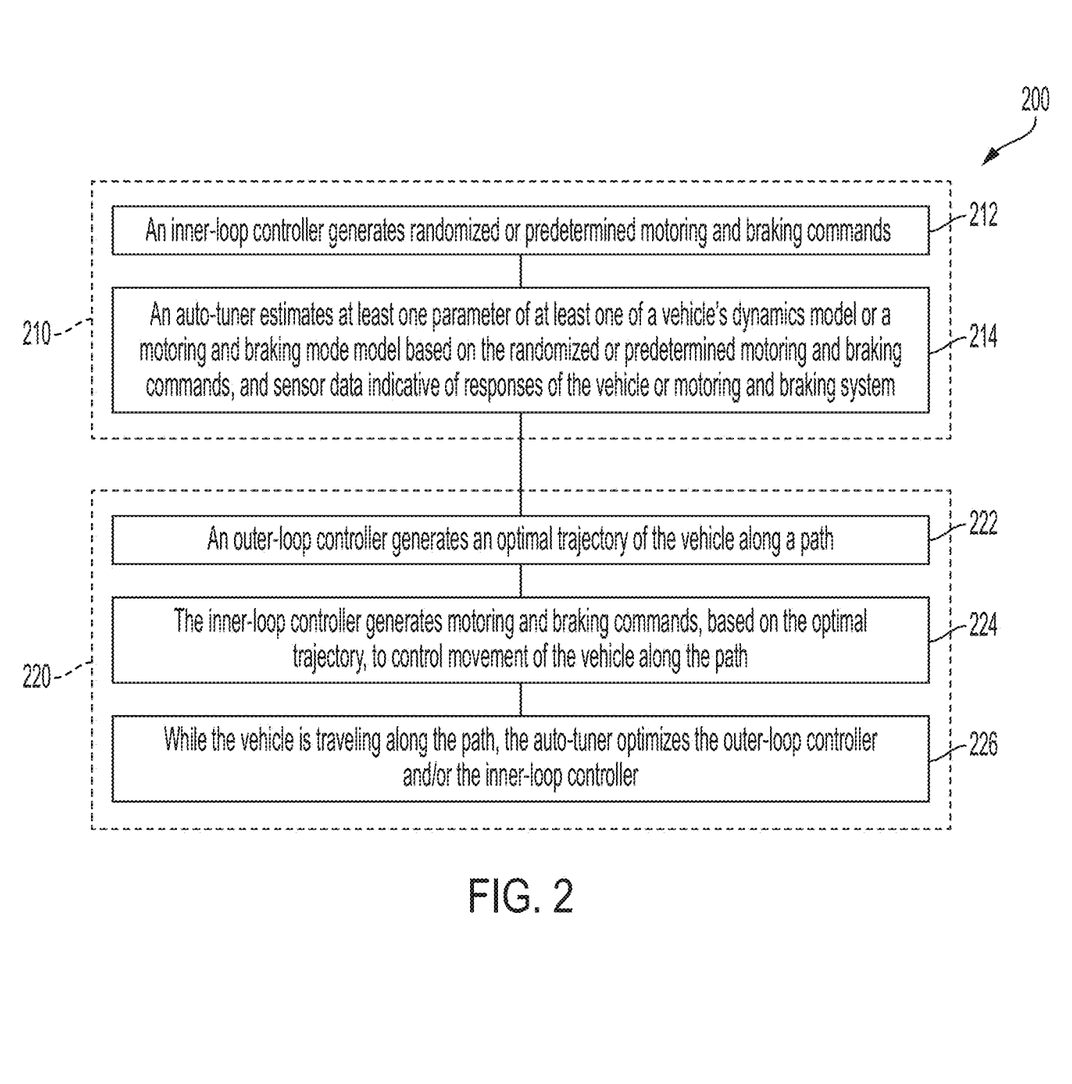
FIG. 2 is a flow chart of a method of controlling a vehicle in accordance with some embodiments.

FIG. 2 is flow chart of a method 200, in accordance with some embodiments. In at least one embodiment, the method 200 is performed by one or more processors, by one or more computer platforms as described herein, or by one or more of the outer-loop controller 130, inner-loop controller 140 and auto-tuner 150.

In the example configuration in FIG. 2, the method 200 comprises operations of a self-training mode 210, and operations of a normal or tuning mode 220. In some embodiments, the operations of the self-training mode 210 are omitted.

The self-training mode 210 comprises operations 212, 214. At operation 212, an inner-loop controller generates randomized or predetermined motoring and braking commands. For example, as described herein, the inner-loop controller 140 generates randomized or predetermined motoring and braking commands for model parameter estimation.

At operation 214, an auto-tuner estimates at least one parameter of at least one of a vehicle's dynamics model or a motoring and braking mode model based on the randomized or predetermined motoring and braking commands, and sensor data indicative of responses of the vehicle or motoring and braking system. For example, as described herein, the auto-tuner 150 estimates at least one parameter of at least one of a vehicle's dynamics model 151 or a motoring and braking model 152 based on the randomized or predetermined motoring and braking commands, and sensor data 116/166 indicative of responses of the vehicle 100 or motoring and braking system 110. In at least one embodiment, the vehicle's dynamics model 151 and/or motoring and braking model 152 with the estimated one or more parameters is/are provided to, or used in conjunction with, the corresponding outer-loop controller 130 and/or inner-loop controller 140 in the normal or tuning mode 220.

The normal or tuning mode 220 comprises operations 222, 224, 226. At operation 222, an outer-loop controller generates an optimal trajectory of the vehicle along a path. For example, as described herein, the outer-loop controller 130 generates an optimal trajectory 136 of the vehicle 100 along a path 102. In some embodiments, the outer-loop controller 130 uses the corresponding vehicle's dynamics model 151 to generate the optimal trajectory 136. In one or more embodiments, the outer-loop controller 130 is trained by a neural network in accordance with the corresponding vehicle's dynamics model 151, and the trained outer-loop controller 130 generates the optimal trajectory 136.

At operation 224, the inner-loop controller generates motoring and braking commands, based on the optimal trajectory, to control movement of the vehicle along the path. For example, as described herein, the inner-loop controller 140 generates motoring and braking commands 146, based on the optimal trajectory 136, to drive, or control movement of, the vehicle 100 along the path 102. In some embodiments, the inner-loop controller 140 uses the corresponding motoring and braking model 152 to generate the motoring and braking commands 146 corresponding to the optimal trajectory 136. In one or more embodiments, the inner-loop controller 140 is trained by a neural network in accordance with the corresponding motoring and braking model 152, and the trained inner-loop controller 140 generates the motoring and braking commands 146 corresponding to the optimal trajectory 136.

At operation 226, while the vehicle is traveling along the path, the auto-tuner optimizes the outer-loop controller and/or the inner-loop controller. For example, as described herein, while the vehicle 100 is traveling along the path 102, the auto-tuner 150 optimizes the outer-loop controller 130 and/or the inner-loop controller 140. In some embodiments, the auto-tuner 150 optimizes one or more parameters of the vehicle's dynamics model 151 and/or the motoring and braking model 152. In at least one embodiment, the optimized parameters are used to either directly update the model 151 or 152 in the corresponding outer-loop controller 130 or inner-loop controller 140. In one or more embodiments, the updated model 151 or 152 with the optimized parameters is used to train or tune the corresponding outer-loop controller 130 or inner-loop controller 140. One or more advantages achievable in the control system described with respect to FIG. 1 is/are also achievable in the method 200.

The described methods include example operations, but they are not necessarily required to be performed in the order shown. Operations may be added, replaced, changed order, and/or eliminated as appropriate, in accordance with the spirit and scope of embodiments of the disclosure. Embodiments that combine different features and/or different embodiments are within the scope of the disclosure and will be apparent to those of ordinary skill in the art after reviewing this disclosure.

Figure 3:
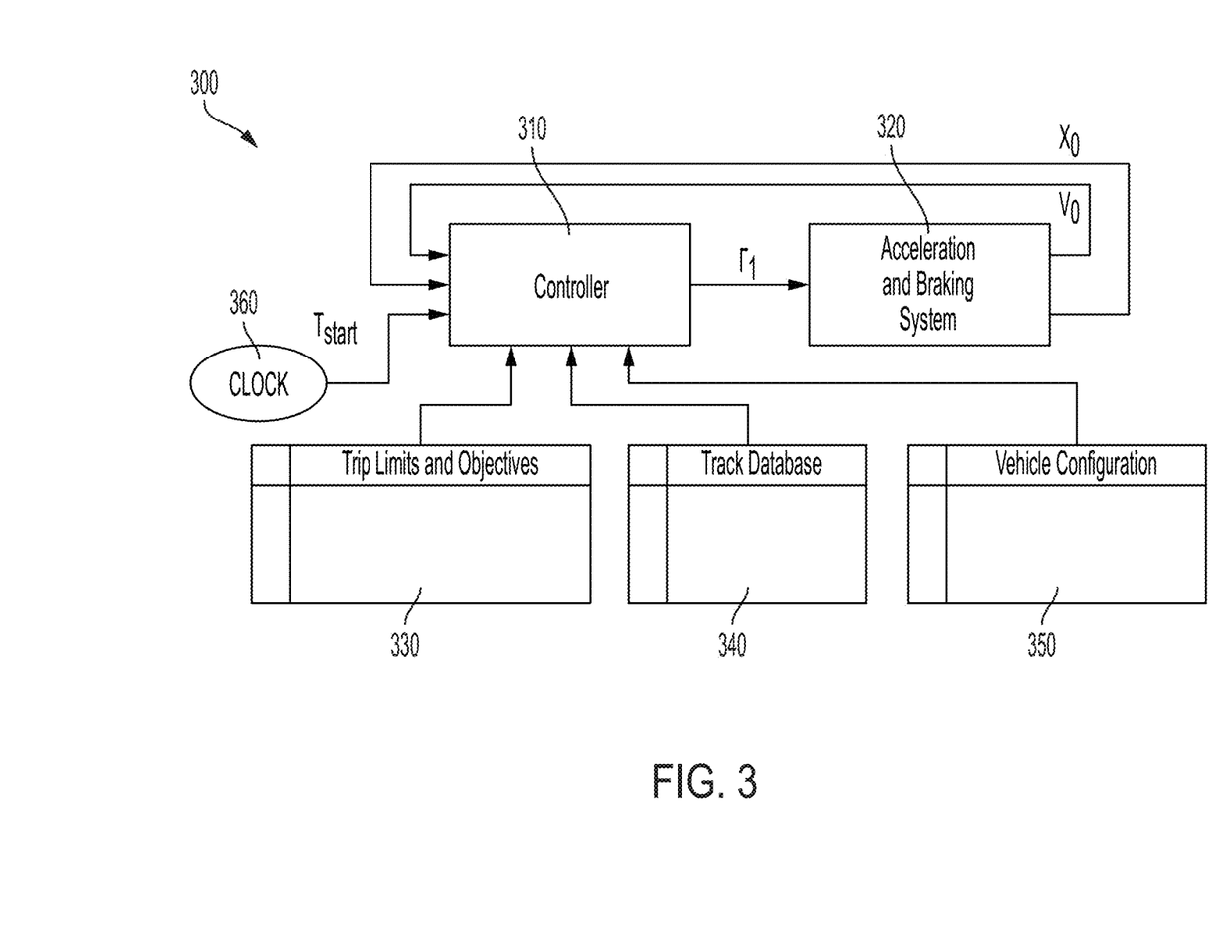
FIG. 3 is a schematic diagram of a vehicle having an optimal adaptive controller in accordance with some embodiments.

FIG. 3 is a schematic diagram of a vehicle 300 having an optimal adaptive controller, in accordance with some embodiments.

The vehicle 300 comprises an optimal adaptive controller 310 and a motoring and braking system 320. In some embodiments, the controller 310 comprises at least one processor or computing platform as described with respect to FIG. 5. In at least one embodiment, the controller 310 corresponds to the outer-loop controller described with respect to FIG. 1. In some embodiments, the controller 310 corresponds to at least one controller described in U.S. application Ser. No. 16/436,440, filed Jun. 10, 2019, the entire contents of which are incorporated by reference herein. The motoring and braking system 320 corresponds to the motoring and braking system described with respect to FIG. 1.

In some embodiments, the controller 310 is configured to apply an optimal control technique to drive the vehicle 300. In at least one embodiment, optimal control involves treating a control problem as a model-based optimization problem where the control law is computed through optimizing a given objective for a known process model (the model of the system, e.g., a vehicle, being controlled) under the presence of one or more constraints. For this purpose, the controller 310, also referred to as an optimal controller or optimal adaptive controller in one or more embodiments, is configured to solve an optimization problem based on a current state of the vehicle 300, at least one control objective, and at least one constraint.

In the example configuration in FIG. 3, the current state of the vehicle 300 includes a current speed (or velocity) Vo of the vehicle 300, and a current position Xo of the vehicle 300 on the path. In at least one embodiment, the current speed of the vehicle 300 is acquired by a speed sensor (not shown) in the motoring and braking system 320 or by an independent speed determination system using Doppler radar, camera (video odometry) and/or Light Detection And Ranging (LiDAR) equipment. The current position Xo of the vehicle 300 is acquired, in one or more embodiments, by a sensor (not shown), such as a camera, a radar, a LiDAR scanner, or a radio frequency (RF) transceiver, that reads corresponding visible, radar, LiDAR or RF data embedded in a sign arranged along the path, in an arrangement known as a communication based train control (CBTC) system. Other configurations where the current state of the vehicle 300 include other operational parameters of the vehicle 300 and/or how such operational parameters are acquired are within the scopes of various embodiments. For example, in at least one embodiment, the current state of the vehicle 300 includes a current acceleration of the vehicle 300 acquired by an acceleration sensor of the vehicle 300.

In the example configuration in FIG. 3, at least one control objective and at least one constraint to be used by the controller 310 in formulating and/or solving the optimization problem are included in a trip limits and objectives database 330, a track database 340, and a vehicle configuration database 350. One or more of the trip limits and objectives database 330, track database 340 and vehicle configuration database 350 is/are contained in a computer readable storage medium for access by the controller 310 or a processor thereof, as described with respect to FIG. 5.

At least one control objective is included in the trip limits and objectives database 330. Examples of at least one control objective include, but are not limited to, minimum amount of time to drive the vehicle from a start location to a target location on the path, minimum amount of energy consumption to drive the vehicle from the start location to the target location, and minimum excessive braking along the path. In at least one embodiment, the controller 310 is configured to solve the optimization problem with a mixed control objective, for example, a mixed time and energy objective. In this situation, the trip limits and objectives database 330 includes corresponding time and energy weights for the mixed time and energy objective. A further example includes a mixed objective of time, energy and excessive braking with three corresponding weights. In some embodiments, the controller 310 is configured to change or adjust, in real-time while the vehicle is travelling on the path, the control objective. In an example, the controller 310 changes the control objective from time to energy, or from time or energy to a mixed time and energy objective. In another example, the controller 310 adjusts time and/or energy weights in a mixed time and energy objective to adapt the motion of the vehicle to new requirements from the system or a user. Other configurations for selecting and/or updating the control objective(s) are within the scopes of various embodiments.

Constraints in the optimization problem include one or more trip constraints, track constraints, and vehicle constraints. Trip constraints are limits related to the trip of the vehicle 300 along the path, and are included in the trip limits and objectives database 330. Examples of trip constraints include, but are not limited to, maximum and minimum arrival times at a location on the path, and constraints on braking. Track constraints are limits related to the path along which the vehicle 300 travels, and are included in the track database 340. Examples of track constraints include, but are not limited to, maximum allowable speed limit, friction, traction or grade profile of the path. Vehicle constraints are limits related to the vehicle 300 and are included in the vehicle configuration database 350. In at least one embodiment, vehicle constraints are parameters of a model of the vehicle 300 to be used by the controller 310 in the optimization problem. Examples of vehicle constraints include, but are not limited to, maximum braking force, maximum acceleration (or propulsion) force, vehicle mass, latencies/delays in the motoring and braking systems. Like the control objective, one or more constraints is/are changeable and/or adjustable by the controller 310 in real-time while the vehicle is travelling on the path. Other configurations for selecting and/or updating one or more constraints are within the scopes of various embodiments.

The controller 310 is configured to solve the optimization problem, using the current state from the motoring and braking system 320 and/or at least one sensor, at least one control objective with any applicable corresponding weight from the trip limits and objectives database 330, and one or more constraints from the trip limits and objectives database 330, track database 340 and vehicle configuration database 350. A solution for optimal control can be feasible or optimal. A feasible solution is one which satisfies the given constraints, for example, driving a vehicle from one location to another without over speeding. In some situations, there are various possible ways, i.e., various feasible solutions, to a control problem. An optimal solution is not only implicitly feasible but is the best feasible solution among the available feasible solutions. An optimal solution is achieved via minimizing or maximizing a control objective, for example, driving a vehicle from one location to another, without over speeding, in a minimum amount of time. This allows the number of feasible (possible) solutions to the control problem to be reduced from a large amount to a single high quality result. In some embodiments, the controller solved an optimization problem when an optimal solution has been achieved.

In some embodiments, optimization models are configured with an aim to guarantee feasibility and optimality of the resultant solution. This is achievable by presenting the optimal control law in a convex representation which guarantee that both feasible and optimal solutions are attainable for a feasible set of constraints. In addition, convex optimization problems are solvable far quicker and more efficiently than non-convex optimization problems. Nevertheless, in at least one embodiment, the optimization problem to be solved by the controller 310 is a non-convex optimization problem. In at least one embodiment, the optimization problem is a convex optimization problem. In at least one embodiment, the convex optimization problem is a convex second order cone problem. Due to the mathematical nature of the convex second order cone problem, it is possible to determine if the control problem is infeasible (e.g., arrival time, speed limit, or stopping point are impossible to achieve) in a fraction of the time it takes to solve one control iteration. Further, if the control problem is determined to be feasible, the solution is guaranteed to be optimal. Examples of one or more non-convex optimization problems, convex optimization problems and convex second order cone problems, and their corresponding solutions, are described in U.S. Provisional Patent Application No. 62/682,537, filed Jun. 8, 2018, the entirety of which is hereby incorporated by reference.

In the example configuration in FIG. 3, the controller 310 is configured to solve the optimization problem in the time domain, in accordance with a clock signal from an internal clock circuit 360. For example, the controller 310 is configured to solve the optimization problem at every control cycle dictated by the clock signal from the clock circuit 360. In at least one embodiment, each control cycle is 300 ms or shorter. As a result, the optimization problem is solved multiple times at a plurality of discretization nodes along the path. Adjacent discretization nodes are arranged at a predetermined time interval corresponding to the clock signal. Physical distances between adjacent discretization nodes are, however, not necessarily equal due to non-linearities of various factors and/or parameters. In some situations, such non-linearities present one or more concerns when attempting to solve optimization problems in the time domain.

In another example configuration, the controller 310 is configured to solve the optimization problem in the position domain. For example, the controller 310 is configured to solve the optimization problem at every discretization node among a plurality of discretization nodes arranged at a predetermined distance along the path. Adjacent discretization nodes are therefore equally spaced. In some situations, discretization of the path and solving optimization problems in the position domain address one or more concerns met when attempting to solve optimization problems in the time domain.

Figure 4:
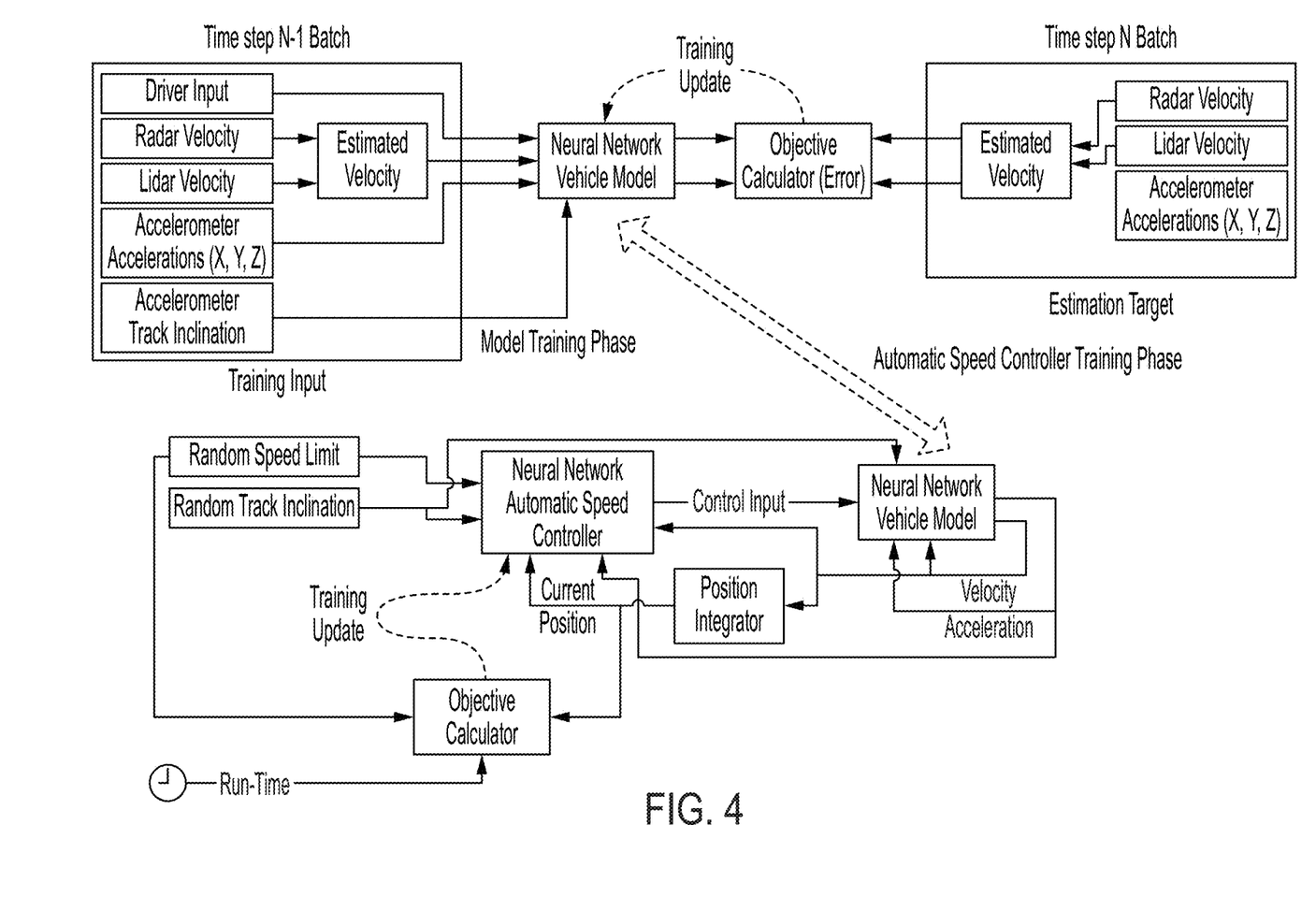
FIG. 4 is a schematic diagram of a self-learning controller for a vehicle in accordance with some embodiments.

FIG. 4 is a schematic diagram of a self-learning controller 400 for a vehicle, in accordance with some embodiments.

Figure 5:
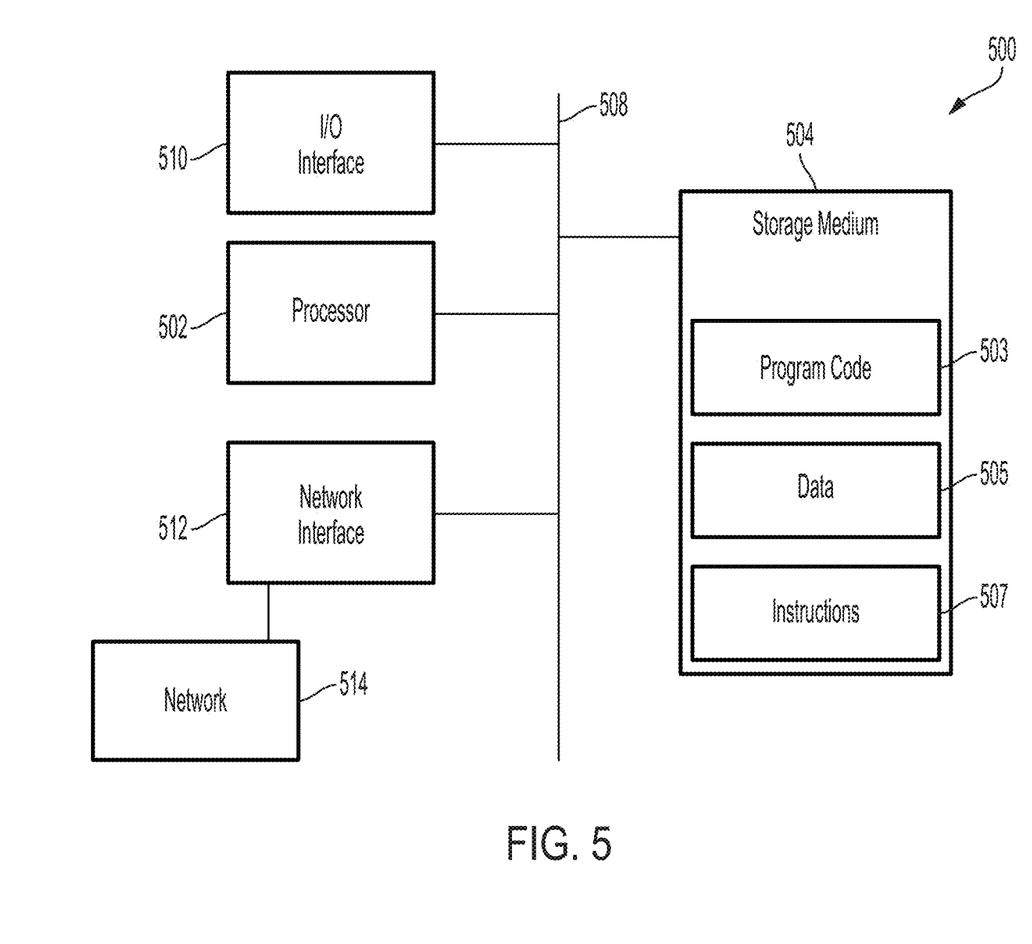
FIG. 5 is a block diagram of a computing platform in accordance with some embodiments.

In some embodiments, the controller 400 comprises at least one processor or computing platform as described with respect to FIG. 5. In at least one embodiment, the controller 400 corresponds to at least one of the outer-loop controller or the inner-loop controller described with respect to FIG. 1. In some embodiments, the controller 400 corresponds to at least one controller described in U.S. application Ser. No. 16/430,207, filed Jun. 3, 2019, the entire contents of which are incorporated by reference herein.

As depicted in FIG. 4, the upper portion of the diagram includes the vehicle module training phase for teaching the vehicle module the kinematics and operational profile of the vehicle. The vehicle module training phase includes operation of the vehicle on a guideway by a driver or control system responsive to a predefined speed profile. Information including driver commands and vehicle status is captured by sensors connected to the vehicle is supplied to the vehicle module, i.e., the neural network vehicle model, and an objective calculator determines a difference between the actual velocity and the estimated velocity of the module and feeds back training update information to update the vehicle module and improve the accuracy.

After the vehicle module is trained, the vehicle module is used in connection with the training of the speed control module in the lower portion of the diagram. Due to the use of the vehicle module, the speed control module is able to be trained on multiple varying scenarios without the need to drive a vehicle on a real guideway. The speed control module generates one or more vehicle control commands in response to receipt of one or more of a speed profile for the vehicle, a guideway attribute (e.g., a guideway inclination value), or a vehicle status attribute (e.g., one or more of a vehicle velocity, vehicle acceleration, or vehicle position). The vehicle module receives the generated one or more vehicle control commands and updates one or more of the vehicle velocity, vehicle acceleration, or vehicle position based on the learned vehicle kinematics as captured in the vehicle module. During execution, an objective calculator provides updates to train the speed control module based on the speed profile and the vehicle status attribute, e.g., vehicle position.

An embodiment of the self-learning vehicle control system is usable in conjunction with a rail vehicle operating on a guideway. The self-learning vehicle control system is usable in conjunction with vehicles other than rail vehicles, e.g., automotive vehicles, watercraft, aerospace vehicles, rovers or drones or the like.

In at least one embodiment, the self-learning process is performed automatically without manual tuning by field application engineers and without disruption to revenue service. In the given embodiment, the self-learning process operates in a "shadow" mode of operation while the vehicle is manually operated by the driver or by another control system in an automatic train operation (ATO), driverless, or unattended mode of operation.

The self-learning process may be performed in two stages. In one stage, a vehicle model is characterized based on a vehicle operated on the guideway in real time. In another stage, a speed controller is built, either on-line or off-line, based on the vehicle model developed in the other stage in order to prepare the speed controller for in the field application. The foregoing self-learning process is much faster, lower cost, more efficient, and adherent to trip constraints than other processes which require manual tuning of the speed controller and significant software development on a vehicle-by-vehicle basis.

One or more embodiments involve an on-board computer having one or more interfaces to connect with position, speed, acceleration, and angular speed measurement sensors, along with two neural networks. In at least one embodiment, the neural networks are executed as part of program code of the on-board computer. In some embodiments, the neural networks are separate from the on-board computer. According to an embodiment, one neural network (a vehicle model neural network) learns to model the vehicle's dynamic behavior and the other neural network (an automatic speed control neural network) teaches itself to drive the vehicle with propulsion and braking control commands while respecting user's or system predefined constraints. In at least one embodiment, the vehicle includes a single neural network as part of the on-board computer during a training phase. In such an embodiment, the single neural network is a vehicle model neural network.

In at least one embodiment, a communication based train control (CBTC) system is able to operate in ATO, driverless or unattended modes of operation where the on-board computer commands the requested propulsion and braking effort, along with coasting, to the vehicle's control systems. An embodiment of the program code of the self-learning vehicle control system comprises at least two modules: a vehicle model and an automatic speed controller. In at least one embodiment, the two modules each comprise a neural network, a vehicle model neural network and an automatic speed control neural network.

With respect to the vehicle model neural network module (also referred to as a vehicle module), the vehicle module characterizes the vehicle in terms of its kinematic properties (including, but not limited to, speed, acceleration, and angular speed in three dimensions (3D)) in response to vehicle control commands. Vehicle control commands include propulsion effort, braking effort, and coasting instructions input by a driver of the vehicle or a control system controlling the vehicle. The vehicle characterization is performed in consideration of the vehicle's geographic location on the guideway (including, but not limited to, grade, curvature, and superelevation) to determine the vehicle control loop properties. Vehicle control loop properties include, but are not limited to, response time, lag, frequency, and amplitude response to various control commands such as step commands in both steady-state and non-steady-state behavior. The vehicle module is executed while the vehicle is operated on the actual guideway controlled by the driver or by a control system. In at least one embodiment, the vehicle module takes into consideration environment factors impacting the vehicle kinematics, e.g., grade, curvature, and elevation.

During characterization, the self-learning system requests a predefined speed profile for the vehicle which the driver or control system is expected to follow by input of commands to the vehicle. In at least some embodiments, the predefined speed profile comprises speed, acceleration, and braking parameters. The self-learning system then monitors the propulsion, braking, or other input commands along with vehicle status attributes. The vehicle status attributes include the vehicle location on the guideway and the vehicle speed, acceleration, and angular velocity. The monitoring is performed in real time while the vehicle is controlled by the driver or the control system. Each of the monitored vehicle status attributes is sampled at a predefined sampling rate. In some embodiments, the predefined sampling rate is twice the input rate required by the vehicle control systems. In some embodiments, the predefined sampling rate is four times the input rate required by the vehicle control systems. In some embodiments, the predefined sampling rate is greater or lesser than twice the input rate required by the vehicle control systems. A larger predefined sampling rate incurs greater bandwidth, storage, and processing costs at the benefit of a higher theoretical modeling accuracy. A smaller predefined sampling rate incurs fewer bandwidth, storage, and processing costs.

In some embodiments, the vehicle control systems includes the vehicle propulsion and braking control systems. In some embodiments, the vehicle control systems includes the vehicle propulsion, steering, and braking control systems. In some embodiments, further control systems are included in the vehicle control systems.

In at least some embodiments, the monitored vehicle input commands, e.g., propulsion and braking effort commands, cover the entire dynamic range of the vehicle control in terms of speed range, acceleration/deceleration range, step (having various magnitudes and durations) commands, linear gradual commands having various slopes and durations and similar. The entire dynamic range is requested, in the form of the requested predefined speed profile to enable the self-learning system to cover the dynamic range of the vehicle control.

At least one intent of covering the dynamic range of the vehicle control is to enable the self-learning system to learn vehicle behavior in as many driving scenarios as possible while using the least amount of guideway time possible. In this manner, the risk of poor driving control when driving at non-standard extremes is mitigated. The requested predefined driving profile from the system is optimized to actuate as much of the model dynamics as possible while using the least amount of guideway driving time. In some embodiments, the requested predefined driving profile causes a driver or controller to execute a majority (i.e., 50% or more) of a range of at least one of the vehicle control commands. For example, a predefined driving profile requests an actual propulsion effort command to drive the vehicle at different propulsion levels covering more than 50% of the possible propulsion levels of the vehicle. In at least one embodiment, the requested predefined driving profile causes a driver or controller to execute at least 75% of a range of at least one of the vehicle control commands. In some embodiments, the predefined driving profile reduces the number of switches from motoring to braking to also reduce a strain in drive relays on the vehicle. An artificial neural network (ANN) algorithm is used to process the commands issued by the driver or the control system in view of the predefined speed profile requested by the self-learning system to monitor the measured vehicle status, e.g., 3D speed, 3D acceleration, and 3D angular velocity. The ANN algorithm, through the application of training techniques, determines the vehicle response properties with the goal of generating a model of the real vehicle, i.e., the vehicle model neural network. In at least some embodiments, the model is an optimal model or the real vehicle as a result of applying optimal training techniques to the ANN algorithm. The vehicle model is considered trained when the fit error on an independent validation dataset is less than a predefined tolerance. In effect, the error between predicted and real acceleration is within tolerance for the acceleration profile, in at least some embodiments.

In at least one embodiment, the vehicle module includes the capability to receive inputs corresponding to one or more of actual propulsion effort commands, actual braking effort commands, a requested speed, a change in the requested speed (including magnitude, and increase or decrease thereof), a requested acceleration/deceleration, a change in the requested acceleration (including magnitude, and increase or decrease thereof), a measured vehicle location, a measured vehicle speed, a measured vehicle acceleration, and a measured vehicle angular speed.

The vehicle being operated on the guideway by a driver or a control system includes one or more of position (location) sensor(s), speed sensor(s), acceleration sensor(s), angular speed sensor(s), and a display. In some embodiments, additional sensors are employed depending on the vehicle capabilities. In some embodiments, the position (location) sensor(s) include, but are not limited to, a GPS receiver, camera, ultra wide band (UWB) sensor, radar, LIDAR, and/or thermal camera. In some embodiments, the speed sensor(s) include, but are not limited to, a GPS receiver, camera, ultra wide band (UWB) sensor, radar, LIDAR, and/or thermal camera. In some embodiments, the acceleration sensor(s) include, but are not limited to, an inertial measurement unit (IMU). In some embodiments, the angular speed sensor(s) include, but are not limited to, an IMU. In some embodiments, the display is used to display the requested speed and acceleration commands. In some embodiments, the display is used to display steering commands.

FIG. 5 is a block diagram of a computing platform 500, in accordance with some embodiments. In some embodiments, one or more of the described controllers, on-board computers, or vehicle control systems is/are implemented as one or more computing platform(s) 500.

The computing platform 500 includes a specific-purpose hardware processor 502 and a non-transitory, computer readable storage medium 504 storing computer program code 503 and/or data 505. The computer readable storage medium 504 is also encoded with instructions 507 for interfacing with the vehicle on which the computing platform 500 is installed. The processor 502 is electrically coupled to the computer readable storage medium 504 via a bus 508. The processor 502 is also electrically coupled to an I/O interface 510 by the bus 508. A network interface 512 is electrically connected to the processor 502 via the bus 508. The network interface 512 is connected to a network 514, so that the processor 502 and/or the computer readable storage medium 504 is/are connectable to external elements and/or systems via the network 514.

In some embodiments, the processor 502 is a central processing unit (CPU), a multi-processor, a distributed processing system, a hard-wired application specific integrated circuit (ASIC), and/or a suitable hardware processing unit. In some embodiments, the processor 502 is configured to execute the computer program code 503 and/or access the data 505 stored in the computer readable storage medium 504 in order to cause the computing platform 500 to perform as one or more components of the systems or controllers described herein, and/or to perform a portion or all of the operations as described in one or more of the methods described herein. For example, the computer program code 503 includes one or more algorithms or models for causing the processor 502 to solve optimization problems, or estimate a parameter of a vehicle or a motoring and braking system, or perform machine learning, or perform real-time auto-tuning, as described herein. The computer readable storage medium 504 includes one or more databases, or at least one control objective, or one or more constraints for the optimization problems and/or parameter estimation, as described herein.

In some embodiments, the computer readable storage medium 504 is an electronic, magnetic, optical, electromagnetic, infrared, and/or a semiconductor system (or apparatus or device). For example, the computer readable storage medium 504 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 504 includes a compact disk-read only memory (CD-ROM), a compact disk-read/write (CD-R/W), and/or a digital video disc (DVD).

In some embodiments, the I/O interface 510 is coupled to external circuitry. In some embodiments, the I/O interface 510 includes a keyboard, keypad, mouse, trackball, trackpad, and/or cursor direction keys for communicating information and commands to processor 502. In at least one embodiment, the I/O interface 510 is coupled to a communication circuit for vehicle-to-vehicle and/or vehicle-to-ground/track communication.

In some embodiments, the network interface 512 allows the computing platform 500 to communicate with network 514, to which one or more other computing platforms are connected. The network interface 512 includes wireless network interfaces such as BLUETOOTH, WIFI, LTE, 5G, WIMAX, GPRS, or WCDMA; or wired network interface such as ETHERNET, USB, or IEEE-1394. In some embodiments, the controllers or methods described herein are implemented in two or more computing platforms 500, and various executable instructions and/or data are exchanged between the different computing platforms 500 via the network 514. By being configured to execute some or all of functionalities and/or operations described with respect to FIGS. 1-4, the computing platform 500 enables the realization of one or more advantages and/or effects described herein.

In some embodiments, a control system for a vehicle comprises a first controller, a second controller, and an auto-tuner. The first controller is configured to generate an optimal trajectory of the vehicle along a path. The second controller is configured to, based on the optimal trajectory generated by the first controller, generate motoring and braking commands to a motoring and braking system of the vehicle for controlling the vehicle to travel along the path. The auto-tuner comprises a processor configured to solve a real-time optimization problem to determine at least one parameter of at least one of the first controller or the second controller.

In some embodiments, a controller for a vehicle comprises at least one processor configured to, using a first model, generate an optimal trajectory of the vehicle along a path. The at least one processor is further configured to, based on the optimal trajectory and using a second model, generate motoring and braking commands to a motoring and braking system of the vehicle for controlling the vehicle to travel along the path. While the vehicle is traveling along the path, the at least one processor is further configured to repeatedly optimize at least one parameter of at least one of the first model or the second model.

In some embodiments, a method of controlling a vehicle comprises generating, by a first controller, an optimal trajectory of the vehicle along a path. The method further comprises generating, by a second controller and based on the optimal trajectory, motoring and braking commands to a motoring and braking system of the vehicle for controlling the vehicle to travel along the path. The method further comprises, while the vehicle is traveling along a path, optimizing at least one of the first controller or the second controller in real-time.

It will be readily seen by one of ordinary skill in the art that the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. A control system for a vehicle, the control system comprising:
    a first controller configured to generate, by solving a first optimization problem, an optimal trajectory of the vehicle along a path;
    a second controller configured to, based on the optimal trajectory generated by the first controller, generate motoring and braking commands to a motoring and braking system of the vehicle for controlling the vehicle to travel along the path; and
    an auto-tuner comprising a processor configured to solve a real-time second optimization problem to determine at least one parameter of the first controller.

2. The control system of claim 1, wherein
    the second controller is a controller separate from the first controller.

3. The control system of claim 1, wherein
    the optimal trajectory comprises an optimal profile of at least one of speed, acceleration or jerk of the vehicle along the path.

4. The control system of claim 1, wherein
    the second controller is an optimal adaptive controller configured to, based on the optimal trajectory generated by the first controller, solve a third optimization problem to achieve at least one control objective under at least one constraint, to generate optimal motoring and braking commands as the motoring and braking commands for controlling the vehicle to travel along the path.

5. The control system of claim 1, wherein
    the second controller comprises a neural network machine learning controller.

6. The control system of claim 1, wherein
the second controller comprises a Proportional-Integral-Derivative (PID) controller.

7. The control system of claim 1, wherein
the second controller is configured to, in a self-training mode, generate randomized or predetermined motoring and braking commands to the motoring and braking system, for estimating at least one parameter of at least one of
a first model of motion dynamics of the vehicle, or
a second model of the motoring and braking system of the vehicle.

8. The control system of claim 7, wherein
the processor of the auto-tuner is configured to, in the self-training mode, estimate the at least one parameter of the at least one of the first model or the second model based on
the randomized or predetermined motoring and braking commands, and
sensor data indicative of responses of the vehicle or the motoring and braking system to the randomized or predetermined motoring and braking commands.

9. The control system of claim 8, wherein
the processor of the auto-tuner is configured to provide at least one of
the first model to the first controller to enable the first controller to generate the optimal trajectory of the vehicle along the path, or
the second model to the second controller to enable the second controller to, based on the optimal trajectory generated by the first controller, generate the motoring and braking commands to the motoring and braking system of the vehicle for controlling the vehicle to travel along the path.

10. The control system of claim 9, wherein
the processor of the auto-tuner is configured to, while the vehicle is traveling along the path, repeatedly solve the real-time second optimization problem to optimize at least one parameter of at least one of the first model in the first controller or the second model in the second controller.

11. A controller for a vehicle, the controller comprising:
at least one processor configured to
using a first model and by solving a first optimization problem, generate an optimal trajectory of the vehicle along a path,
based on the optimal trajectory and using a second model, generate motoring and braking commands to a motoring and braking system of the vehicle for controlling the vehicle to travel along the path, and
while the vehicle is traveling along the path, repeatedly optimize, by solving a second optimization problem, at least one parameter of at least one of the first model or the second model,
wherein the at least one processor is further configured to, in a self-training mode, estimate the at least one parameter of the at least one of the first model or the second model based on
randomized motoring and braking commands to the motoring and braking system, and
sensor data indicative of responses of the vehicle or the motoring and braking system to the randomized motoring and braking commands, and
wherein the vehicle is a railway vehicle.

12. The controller of claim 11, wherein
the first model comprises a model of motion dynamics of the vehicle, and
the second model comprises a model of the motoring and braking system of the vehicle.

13. The controller of claim 12, wherein
the model of the motoring and braking system comprises at least one of
a model of a motoring system of the vehicle,
a model of a dynamic braking system of the vehicle,
a model of a friction braking system of the vehicle,
a model of a service braking system of the vehicle,
a model of a regenerative braking system of the vehicle, or
a model of an emergency braking system of the vehicle.

14. The controller of claim 11, wherein
the at least one processor is further configured to optimize the at least one parameter under at least one constraint selected from the group consisting of:
a maximum error between a simulated drive of the vehicle in accordance with the first model and an actual drive of the vehicle,
a maximum error between a simulated operation of the motoring and braking system in accordance with the second model and an actual operation of the motoring and braking system, and
maximum and minimum values of the at least one parameter.

15. The controller of claim 11, wherein
the at least one processor is configured to
solve the first optimization problem to achieve at least one first control objective under at least one first constraint, and
solve the second optimization problem to achieve at least one second control objective under at least one second constraint.

16. A method of controlling a vehicle, the method comprising:
generating, by a first controller solving a first optimization problem, an optimal trajectory of the vehicle along a path;
generating, by a second controller and based on the optimal trajectory, motoring and braking commands to a motoring and braking system of the vehicle for controlling the vehicle to travel along the path; and
while the vehicle is traveling along a path, optimizing at least one of the first controller or the second controller in real-time, said optimizing comprises solving a second optimization problem,
wherein the vehicle is a railway vehicle.

17. The method of claim 16, wherein
said generating the optimal trajectory of the vehicle is executed in accordance with a model of motion dynamics of the vehicle, and
said generating the motoring and braking commands based on the optimal trajectory is executed in accordance with a model of the motoring and braking system.

18. The method of claim 17, wherein
said optimizing comprises:
optimizing a parameter of at least one model of the model of motion dynamics of the vehicle or the model of the motoring and braking system, and
updating, using the optimized parameter, the at least one model included in at least one corresponding controller of the first controller or the second controller.

19. The method of claim 17, wherein
said optimizing comprises:
   optimizing at least one model of the model of motion dynamics of the vehicle or the model of the motoring and braking system, and
   training, using a neural network and based on the optimized at least one model, at least one corresponding controller of the first controller or the second controller.

20. The method of claim 17, wherein
said optimizing comprises:
   performing a non-linear optimization of the model of the motoring and braking system, and
   tuning the second controller, which is a Proportional-Integral-Derivative (PID) controller, in accordance with a simulation based on the optimized model of the motoring and braking system.

* * * * *